United States Patent
McLaughlin et al.

(10) Patent No.: US 11,662,715 B2
(45) Date of Patent: May 30, 2023

(54) MULTI-SYNCH OF A PRIMARY AUTOMATION DEVICE WITH MULTIPLE SECONDARIES

(71) Applicant: Honeywell International Inc., Morris Plains, NJ (US)

(72) Inventors: Paul McLaughlin, Ambler, PA (US); Joseph Felix, Landsdale, PA (US); Norman Swanson, Douglassville, PA (US); Jason Urso, Fountain Hills, AZ (US)

(73) Assignee: Honeywell International Inc., Charlotte, NC (US)

( * ) Notice: Subject to any disclaimer, the term of this patent is extended or adjusted under 35 U.S.C. 154(b) by 147 days.

(21) Appl. No.: 16/790,318

(22) Filed: Feb. 13, 2020

(65) Prior Publication Data
US 2021/0255605 A1 Aug. 19, 2021

(51) Int. Cl.
*G05B 19/418* (2006.01)

(52) U.S. Cl.
CPC ...... *G05B 19/4184* (2013.01); *G05B 2219/24186* (2013.01); *G05B 2219/24192* (2013.01); *G05B 2219/31368* (2013.01)

(58) Field of Classification Search
CPC ...... G05B 19/4184; G05B 2219/24186; G05B 2219/24192; G05B 2219/31368
See application file for complete search history.

(56) References Cited

U.S. PATENT DOCUMENTS

| | | | |
|---|---|---|---|
| 4,133,027 A | 1/1979 | Hogan | |
| 5,933,347 A | 8/1999 | Cook et al. | |
| 5,963,448 A | 10/1999 | Flood et al. | |
| 6,170,044 B1 * | 1/2001 | McLaughlin | G05B 9/03 |
| | | | 711/112 |
| 8,948,067 B2 | 2/2015 | Chernoguzov et al. | |
| 9,990,286 B1 | 6/2018 | McLaughlin et al. | |
| 2010/0271989 A1 | 10/2010 | Chernoguzov et al. | |
| 2015/0323910 A1 | 11/2015 | McLaughlin et al. | |

(Continued)

OTHER PUBLICATIONS

Mohammed Asim Niazi, "What is Redundancy in Control Systems", Control Automation website, Jun. 2020, URL:<https://control.com/technical-articles/what-is-redundancy-in-control-systems/> (Year: 2020).*

(Continued)

*Primary Examiner* — Kenneth M Lo
*Assistant Examiner* — Jonathan Michael Skrzycki
(74) *Attorney, Agent, or Firm* — Ortiz & Lopez, PLLC; Kermit D. Lopez; Luis M. Ortiz (57) ABSTRACT

Methods and systems for synchronizing controllers in an automation control system, can involve arranging redundancy elements in an automation control system comprising a group of nodes, wherein the redundancy elements can include one or more primary controllers and a group of concurrent secondary controllers, and wherein a back-up to the primary controller can exist on any node. Such methods and systems can further involve backing-up of the primary controller by the one or more secondary controllers to allow the primary controller to maintain the one or more secondary controllers as a new, alternate secondary controller for a load balancing or an equipment update.

20 Claims, 4 Drawing Sheets

(56) References Cited

U.S. PATENT DOCUMENTS

2015/0378356 A1* 12/2015 Hefeeda ........... G05B 19/41855
                                                      700/9
2017/0277607 A1*  9/2017 Samii ................. G06F 11/2028
2017/0300024 A1  10/2017 Nixon et al.
2019/0056719 A1*  2/2019 Ong .................... G06F 13/4068

OTHER PUBLICATIONS

Wikipedia.com, "Redundnacy (engineering)", Wikipedia website, acquired Dec. 2021, URL:<https://en.wikipedia.org/wiki/Redundancy_(engineering)> (Year: 2021).*

Editorial Staff, "Concept of Redundancy in Control Systems", instrumentation tools website, acquired Dec. 2021, URL:<https://instrumentationtools.com/concept-of-redundancy-in-control-systems/> (Year: 2021).*

"DeltaV™ Virtualization—High Availability and Disaster Recover", DeltaV Distributed Control System, Whitepaper, Emerson Process Management, Oct. 2014.

European Patent Application No. 21156993.4-1224, Extended Search Report from European Patent Office dated Jun. 29, 2021.

* cited by examiner

MULTI-SYNCH OF A PRIMARY AUTOMATION DEVICE WITH MULTIPLE SECONDARIES

TECHNICAL FIELD

Embodiments are generally related to industrial process control and automation systems. More specifically, this disclosure relates to automation control systems in which control applications are not bound to dedicated hardware but rather can float across any hardware within the automation control system.

BACKGROUND

The failure of an industrial control system can lead to costly downtime. There is expense involved in restarting a process along with the actual production losses resulting from a failure. If the process is designed to operate without supervisory or service personnel, all components in the process control system generally need to be fault-tolerant.

A fault-tolerant industrial process control system may employ a 1:1 redundancy system to synchronize the central processing unit (CPU) data in memory, where memory is maintained in an identical fashion in both a primary memory associated with a primary process controller and a secondary memory associated with a secondary process controller using an initial memory transfer followed by updates that are tracked changes to the primary memory image. As known in the art, a memory cache (cache) is a high-speed buffer for use with a lower-speed random access memory (RAM). CPU's without a memory cache (cache) express all changes to the RAM bus where they are captured (data and address). CPU's with write-through caching act in a similar manner. In contrast, CPUs with a cache commonly used for process control systems that need to react to process changes rapidly may not support write-thru caching.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for improved industrial process control and automation systems and methods thereof.

It is another aspect of the disclosed embodiments to provide for automation control systems in which control applications are not bound to dedicated hardware but rather can float across any hardware within an automation control system.

It is another aspect of the disclosed embodiments to provide for a method and system of synchronizing controllers in an automation control system.

The aforementioned aspects and other objectives can now be achieved as described herein. In an embodiment, a method of synchronizing controllers in an automation control system, can involve arranging a plurality of redundancy elements in an automation control system comprising a plurality of nodes, wherein the plurality of redundancy elements include at least one primary controller and a plurality of concurrent secondary controllers, wherein a back-up to the at least one primary controller exists on any node among the plurality of nodes; and backing-up the at least one primary controller by at least one secondary controller among the plurality of concurrent secondary controllers to allow the at least one primary controller to maintain the at least one secondary controller as a new, alternate secondary controller for a load balancing or an equipment update.

In an embodiment of the method, the redundancy elements can comprise compute nodes that support a workload of the at least one primary controller or the at least one secondary controller.

In an embodiment of the method, the automation control system can comprise an automation control hive.

In an embodiment of the method, the automation control hive can comprise control applications and an environment that is not bound to dedicated hardware, but which floats across any hardware with the automation control hive.

In an embodiment of the method, the at least one primary controller and each concurrent secondary controller among the plurality of concurrent secondary controllers can comprise a process controller.

In an embodiment of the method, the equipment update can comprise at least one of: a controller firmware or a software migration.

In an embodiment of the method, the equipment update can comprise a controller hardware migration.

In another embodiment, a system for synchronizing controllers for automation control, can include a plurality of redundancy elements arranged in an automation control system comprising a plurality of nodes, wherein the plurality of redundancy elements include at least one primary controller and a plurality of concurrent secondary controllers, wherein a back-up to the at least one primary controller exists on any node among the plurality of nodes; and a back-up of the at least one primary controller by at least one secondary controller among the plurality of concurrent secondary controllers to allow the at least one primary controller to maintain the at least one secondary controller as a new, alternate secondary controller for a load balancing or an equipment update.

In an embodiment of the system, the redundancy elements can comprise compute nodes that support a workload of the at least one primary controller or the at least one secondary controller.

In an embodiment of the system, the automation control system can comprise an automation control hive.

In an embodiment of the system, the automation control hive can comprise control applications and an environment not bound to dedicated hardware, but which float across any hardware with the automation control hive.

In an embodiment of the system, the at least one primary controller and each concurrent secondary controller among the plurality of concurrent secondary controllers can comprise a process controller.

In an embodiment of the system, the equipment update comprises at least one of: a controller firmware or a software migration.

In an embodiment of the system, the equipment update can comprise a controller hardware migration.

In another embodiment, a system for synchronizing controllers for automation control, can include at least one processor, and a non-transitory computer-usable medium embodying computer program code. The computer-usable medium is capable of communicating with the at least one processor, and the computer program code can include instructions executable by the at least one processor and configured for: arranging a plurality of redundancy elements in an automation control system comprising a plurality of nodes, wherein the plurality of redundancy elements include at least one primary controller and a plurality of concurrent secondary controllers, wherein a back-up to the at least one primary controller exists on any node among the plurality of nodes; and backing-up the at least one primary controller by at least one secondary controller among the plurality of concurrent secondary controllers to allow the at least one primary controller to maintain the at least one secondary controller as a new, alternate secondary controller for a load balancing or an equipment update.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One having ordinary skill in the relevant art will readily recognize that the subject matter disclosed herein can be practiced without one or more of the specific details or with other methods. In other instances, well-known structures or operations are not shown in detail to avoid obscuring certain aspects. This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

As used herein an industrial process facility can an industrial process involving a tangible material that disclosed embodiments apply. For example, oil and gas, chemical, beverage, pharmaceutical, pulp and paper manufacturing, petroleum processes, electrical, and water. An industrial process facility is distinct from a data processing system that only performs data manipulations.

As known in the art, algorithms such as disclosed algorithms may be implemented by hardware or be implemented by software. Regarding hardware-based implementations, algorithm equations can be converted into a digital logic gate pattern, such as using VHDL (a Hardware Description Language) that can then be realized using a programmable device such as a field-programmable gate array (FPGA) or a dedicated application-specific integrated circuit (ASIC) to implement the needed logic gate pattern shown as hardware including digital logic. Regarding software-based algorithm implementations, the processor can implement algorithm code stored in the associated memory.

Figure 1:
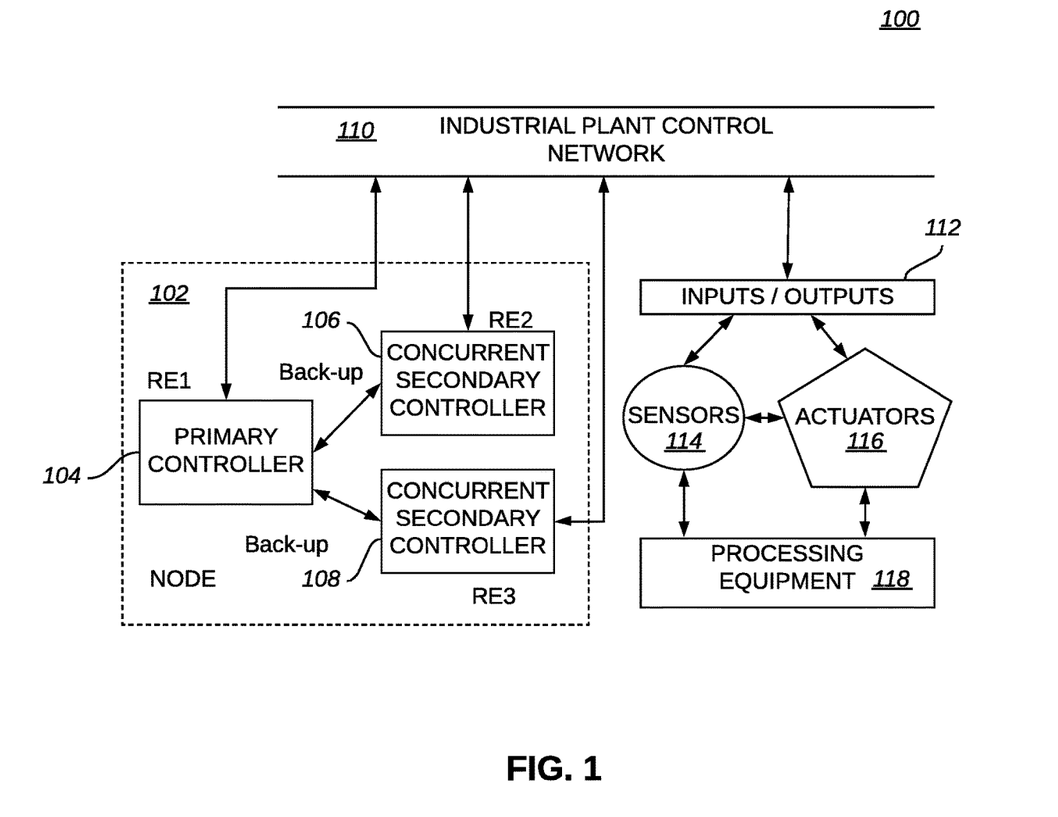
FIG. 1 illustrates a block diagram of a system, which can be implemented in accordance with an embodiment.

FIG. 1 illustrates a block diagram of a system 100, which can be implemented in accordance with an embodiment. The system 100 shown in FIG. 1 can be implemented to operate various functions in an industrial plant control network 110 of an industrial process facility (or one or more industrial process facilities). The system 100 can synchronize one or more controllers for automation control in the industrial process facility as facilitated by the industrial plant control network 110. The system 100 can include one or more nodes such as node 102, which can include a group of redundancy elements, including a redundancy element RE1, a redundancy element RE2, and a redundancy element RE3. The redundancy element RE1 can be, for example, a primary controller 104. The redundancy element RE2 can be, for example, a concurrent secondary controller 106, the redundancy element RE3 can be, for example, a concurrent secondary controller 108. Note that the terms "redundancy" or "redundant" as used here can mean functionally the same with respect to its process control functions, which may allow for different device implementations or memory sizes, for example.

Thus, the system 100 can include a plurality of redundancy elements RE1, RE2, and RE3 arranged in an automation control system including a group of nodes (e.g., an example of a single node is node 102) wherein redundancy elements include at least one primary controller such as the primary controller 104 and a plurality of concurrent secondary controllers such as, for example, the concurrent secondary controller 106 and the concurrent secondary controller 108. A back-up to the primary controller 104 (or to multiple primary controllers) can exist on any node among the group of nodes. In addition, a back-up of the primary controller 104 by at least one secondary controller such as the concurrent secondary controller 106 and/or the concurrent secondary controller 108 can allow the primary controller 104 to maintain the concurrent secondary controller 106 and/or the concurrent secondary controller 108 as a new, alternate secondary controller for a load balancing or an equipment update. Not that the term "primary controller" can also be referred to simply as "primary" and the term "concurrent secondary controller" can also be referred to as "secondary controller" or simply "secondary".

The node 102 can couple to the industrial plant network 110, which in turn can couple to an inputs/outputs 112 that can couple to one or more sensors 114 and one or more actuators 116. Thus, the industrial plant network 110 can couple various inputs and outputs to the primary controller 104 including, for example, analog inputs (A/I), analog outputs (A/O), digital inputs (D/I), and digital outputs (D/O), these inputs and outputs being connected to various processing equipment 118 such as valves, pressure switches, pressure gauges, thermocouples, and so forth, which can be used to indicate the current information or status to enable controlling of a process of the aforementioned industrial process facility.

Note that the system 100 can function as an automation control system, an example of which is an automation control hive, which can use a flexible execution model where control applications and environment are not bound to dedicated hardware but rather can float across any hardware within the automation control hive. As such, the primary controller and its backup secondary can exist on any viable hardware nodes, and there may be dynamic cases where there is a need to move the secondary controller to some other hardware in order to balance the load of execution and redundancy. To do this with standard 1:1 redundancy primary/backup, to move the secondary controller would involve a loss of synch and a re-synch, which exposes a window of vulnerability should the primary controller fail while the secondary controller is being moved.

The disclosed approach allows the primary controller to maintain a secondary controller while creating a new, alternate secondary controller for load balancing or equipment update so that the current secondary can be shut down without any loss of availability, or disruption to synchronization. This approach allows for multiple concurrent secondaries as well, so that there are more than one active, viable backup nodes.

The automation control hive (also referred to as a "control hive" or simply a "hive) is a breakthrough concept in automation flexibility and capability, and can leverage the disclosed approach to establish high-availability redundancy elements (M:N redundancy) where a backup to a primary can exist on any node in the hive, both for embedded and virtual/server based hive deployments. The term "hive" as utilized herein can relate to a collection of physical controllers that can present themselves as a single virtual pool of compute. A user can assign control applications to the Hive, and the system can run the control applications on the hardware where there is sufficient capacity available.

To realize another key benefit of the hive-load balancing across the computing resources as well as easy addition of new hardware for incremental compute, it may be necessary to have a method to "move" the secondary to another node without any loss of availability (e.g., an interval in which the primary does not have an active, synchronized backup). Note that the term "PRI" can refer to "primary" and the term "SEC" can refer to "secondary." Conventional redundancy mechanisms would require the SEC to be shutdown, then restarted/re-synchronized in a different node, which can take several minutes to accomplish and exposes a window of vulnerability to the availability of the control mission. Note that the disclosed embodiments can also be applied to a fixed configuration of redundant elements intended to represent a controller where redundant elements can be deleted or added by manual configuration.

This new concept both removes the window of vulnerability, and also can allow a primary control mission to be simultaneously backed up by multiple viable secondaries, further improving the availability of the control mission. This approach can leverage 1:1 redundancy design, while extending it so that multiple (e.g., two or more) secondaries can exist simultaneously. There are two main use cases. The first case can involve a workload distribution that requires moving a SEC to another node. This main use case can occur when a set of M physical nodes exist in the hive, with an initial ideal distribution of PRI control containers and SEC backup containers. Note that "PRI" can refer to "primary" and "SEC" can refer to "secondary." When nodes fail, the remaining nodes can adapt and both may fail over any PRI on the failed nodes and also reestablish SEC capability on the remaining M-N nodes (where M=total number of nodes and N=number of failed nodes). As the site personnel repair the failed N nodes, the system may need to move SEC workloads to these repaired nodes to relieve the compute on the M-N nodes that maintained control and availability.

A second case can involve 1:S redundancy where every 1 PRI in the hive can be backed up simultaneously by S, S>=1 secondaries. This situation can increase the availability further beyond the inherent improvement of 1:1 redundancy by allowing more than 1 SEC for every PRI.

Both of these main use cases can be handled with a common design. A mechanism to achieve this 1:S redundancy can involve extending the synch and synch maintenance mechanisms and to leverage the control hive redundancy management network. When a PRI:SEC pair exists, and a new SEC is intended to be brought on-line, the PRI can both maintain the synch as it currently does through tracking any control changes, while also using a "trickle synch" mechanism to create an additional SEC. These redundancy communications can be multicast on a redundancy management network so that the new SEC gets the exact same control data as the existing SEC, and so that there is no extra traffic load on the redundancy management network.

A simple arbitration scheme (e.g. lowest node address) can be established so that for the S secondaries, a known, explicit prioritization can be maintained to ensure the one and only one SEC advances to the PRI state. Since the S secondaries can be synchronized both to the PRI as well as to themselves, on this failover case, the new PRI and its remaining SEC nodes can maintain the synch and may not require a new synchronization, which can also eliminate a window of time vulnerability.

In the system 100 the redundancy elements such as RE1, RE2 and RE3 can constitute compute nodes that support the workload of the primary controller 104 or one of the secondary controllers 106 or 108. In some embodiments, the primary controller 104, the concurrent secondary controller 106, and the concurrent secondary controller 108 can each function as a process controller. In addition, the equipment update (e.g., an update to the processing equipment 118) can constitute at least one of: a controller firmware and/or a software migration. In some embodiments, such an equipment update may be a controller hardware migration.

Figure 2:
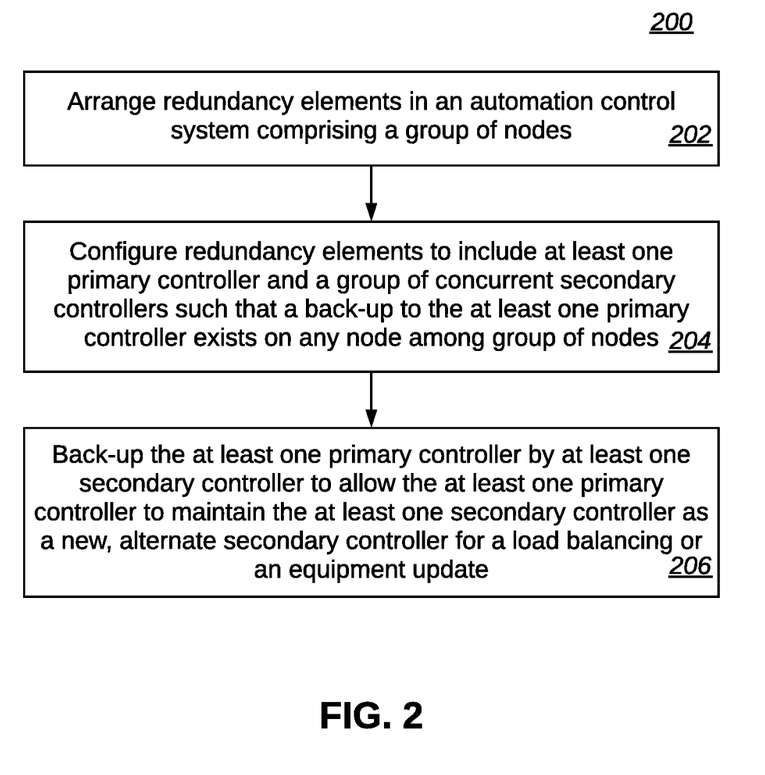
FIG. 2 illustrates a method of synchronizing controllers in an automation control system, in accordance with an example embodiment.

FIG. 2 illustrates a method 200 of synchronizing controllers in an automation control system such as the system 100 shown in FIG. 1, in accordance with an example embodiment. As shown at block 202, a step or operation can be implemented to arrange a plurality of redundancy elements (e.g., such as RE1, RE2, RE3, etc., shown in FIG. 1) in an automation control system comprising a plurality of nodes (e.g., node 102 depicted in FIG. 1). The redundancy elements can be configured, as shown at block 204, to include at least one primary controller (e.g., such as the primary controller 104 shown in FIG. 1) and a plurality of concurrent secondary controllers (e.g., such as the concurrent secondary controller 106 and the concurrent secondary controller 108 shown in FIG. 1), wherein a back-up to the at least one primary controller exists on any node among the plurality of nodes.

Thereafter, as depicted at block 206, a step or operation can be implemented to back-up the at least one primary controller by at least one secondary controller among the plurality of concurrent secondary controllers to allow the at least one primary controller to maintain the at least one secondary controller as a new, alternate secondary controller for a load balancing or an equipment update (e.g., such as updating the processing equipment 118 shown in FIG. 1).

Figure 3:
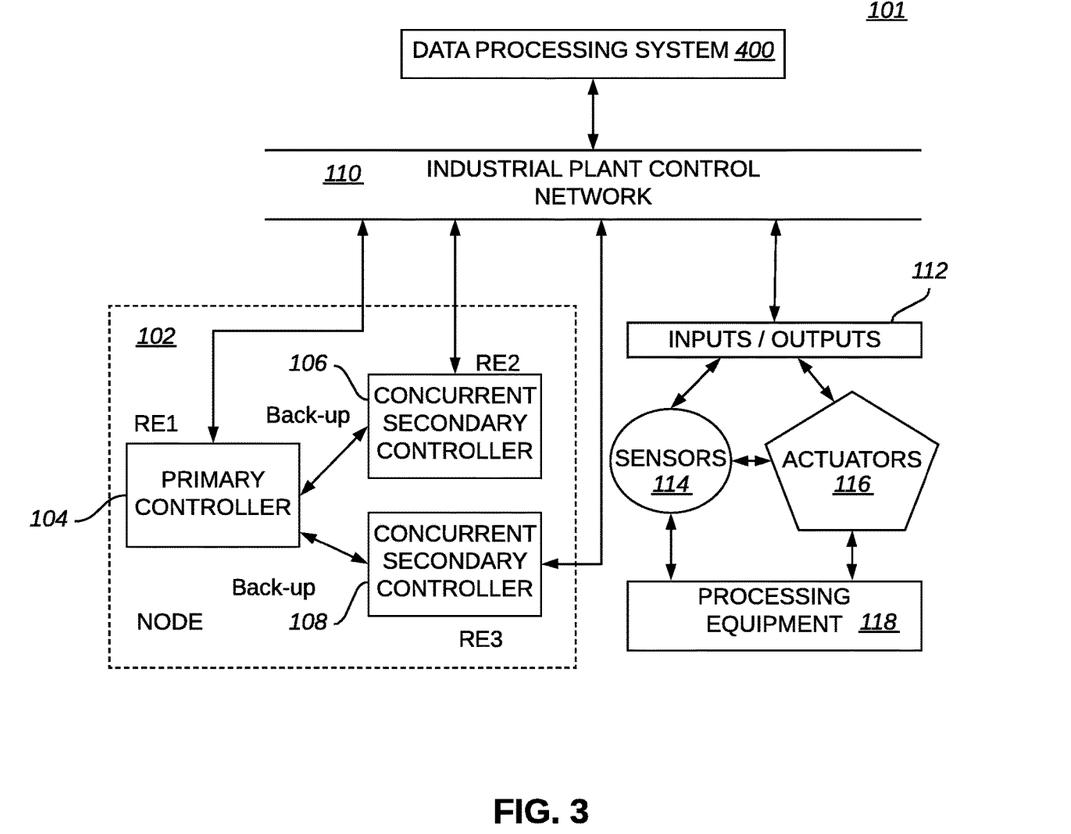
FIG. 3 illustrates a block diagram of a system, which can be implemented in accordance with another embodiment.

FIG. 3 illustrates a block diagram of a system 101, which can be implemented in accordance with another embodiment. The system 101 shown in FIG. 3 is similar to the system 100 depicted in FIG. 1 with the difference being the presence of a data processing system 400 coupled to the industrial plant control network 110. Note that in FIGS. 1-5, identical or similar parts are generally indicated by identical reference numerals. For details regarding the data processing system 400, refer to FIG. 4 and FIG. 5 herein. The data processing system 400 may be a computer such a supervisory computer or a group of supervisory computers.

The disclosed embodiments are described at least in part herein with reference to the flowchart illustrations, steps and/or block diagrams of methods, systems, and computer program products and data structures and scripts. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which can execute via the processor of the computer or other programmable data processing apparatus, and may create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a system composed of different hardware and software modules and different types of features may be considered a special-purpose computer designed with a purpose of enabling synchronizing of controllers in an automation control system, as discussed herein. In general, however, embodiments may be implemented as a method, and/or a computer program product at any possible technical detail level of integration. The computer program product may include a computer readable storage medium (or media) having computer readable program instructions thereon for causing a processor to carry out aspects of the embodiments, such as the steps, operations or instructions described herein.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks herein.

The flow charts and block diagrams in the figure can illustrate the architecture, the functionality, and the operation of possible implementations of systems, methods, and computer program products according to various embodiments (e.g., preferred or alternative embodiments). In this regard, each block in the flow chart or block diagrams may represent a module, a segment, or a portion of instructions, which comprises one or more executable instructions for implementing the specified logical function(s).

In some alternative implementations, the functions noted in the blocks may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

Figure 4:
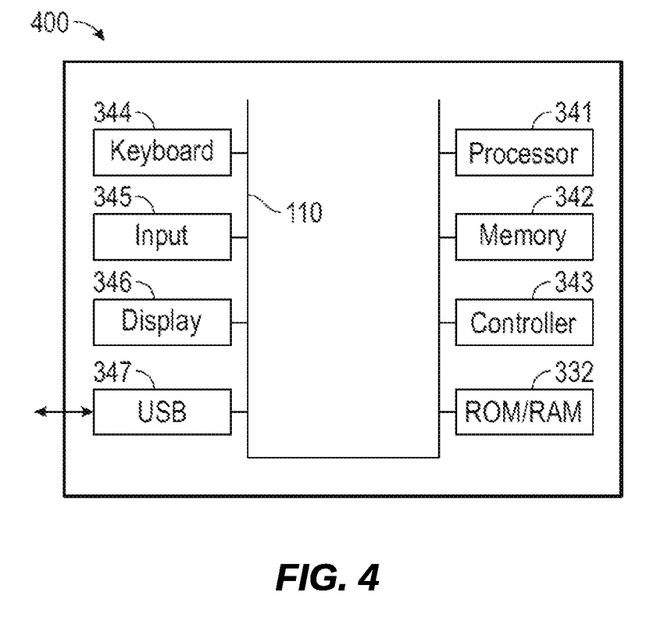
FIG. 4 illustrates a schematic view of a computer system, in accordance with an embodiment.
Figure 5:
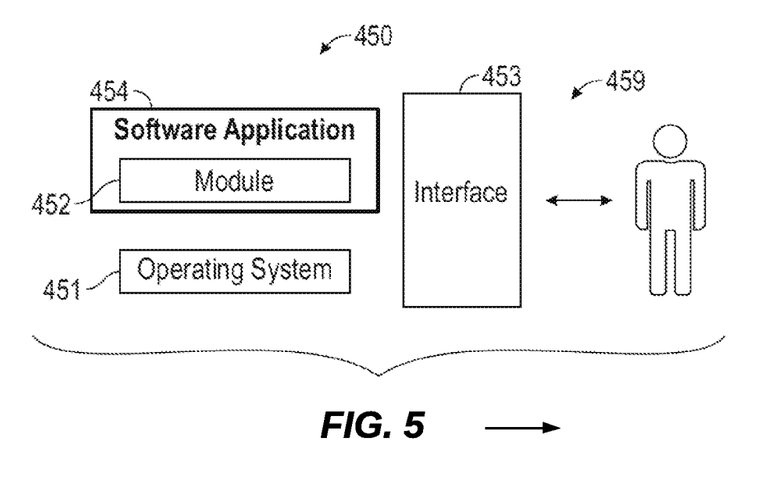
FIG. 5 illustrates a schematic view of a software system including a module, an operating system, and a user interface, in accordance with an embodiment.

FIG. 4 and FIG. 5 are shown only as exemplary diagrams of data-processing environments in which example embodiments may be implemented. It should be appreciated that FIG. 4 and FIG. 5 are only exemplary and are not intended to assert or imply any limitation with regard to the environments in which aspects or embodiments of the disclosed embodiments may be implemented. Many modifications to the depicted environments described and illustrated herein may be made without departing from the spirit and scope of the disclosed embodiments.

As illustrated in FIG. 4, some embodiments may be implemented in the context of a data-processing system 400 that can include, for example, one or more processors such as a processor 341 (e.g., a CPU (Central Processing Unit) and/or other microprocessors), a memory 342, a controller 343, additional memory such as ROM/RAM 332 (i.e. ROM and/or RAM), a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.) and/or other peripheral connections and components. The database discussed previously herein may in some embodiments be located with, for example, the memory 342 or another memory.

The system bus can serve as the main electronic information highway interconnecting the other illustrated components of the hardware of data-processing system 400. In some embodiments, the processor 341 may be a CPU that functions as the central processing unit of the data-processing system 400, performing calculations and logic operations required to execute a program. Read only memory (ROM) and random access memory (RAM) of the ROM/RAM 344 constitute examples of non-transitory computer-readable storage media.

The controller 343 can interface with one or more optional non-transitory computer-readable storage media to the system bus. These storage media may include, for example, an external or internal DVD drive, a CD ROM drive, a hard drive, flash memory, a USB drive or the like. These various drives and controllers can be optional devices. Program instructions, software or interactive modules for providing an interface and performing any querying or analysis associated with one or more data sets may be stored in, for example, ROM and/or RAM 344. Optionally, the program instructions may be stored on a tangible, non-transitory computer-readable medium such as a compact disk, a digital disk, flash memory, a memory card, a USB drive, an optical disc storage medium and/or other recording medium.

As illustrated, the various components of data-processing system 400 can communicate electronically through a system bus or similar architecture. The system bus may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc).

FIG. 5 illustrates a computer software system 450 for directing the operation of the data-processing system 400 depicted in FIG. 4. The software application 454, may be stored for example in memory 342 and/or another memory and can include one or more modules such as the module 452. The computer software system 450 also includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement the steps, instructions, operations and scripts such as those discussed herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures, which can perform a particular task or can implement a particular data type. A module can be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of the disclosed modules, whether primarily software-based and/or hardware-based or a combination thereof, according to the approach described herein can lead to improvements in processing speed and ultimately in energy savings and efficiencies in a data-processing system such as, for example, the data-processing system 400 shown in FIG. 4.

The disclosed embodiments can constitute an improvement to a computer system (e.g., such as the data-processing system 400 shown in FIG. 4) rather than simply the use of the computer system as a tool. The disclosed modules, instructions, steps and functionalities discussed herein can result in a specific improvement over prior systems, resulting in improved data-processing systems.

FIGS. 4-5 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology including improvements to automation control systems used in, for example, industrial facilities. The disclosed embodiments can offer technical improvements to a computer-technology such as an automation control system that includes a data-processing system, and further can provide for a non-abstract improvement to a computer technology via a technical solution to the technical problem(s) identified in the background section of this disclosure. The disclosed embodiments require less time for processing and also fewer resources in terms of memory and processing power in the underlying automation control system including the computer technology for implementing the automation control system. Such improvements can result from implementations of the disclosed embodiments. The claimed solutions may be rooted in computer technology in order to overcome a problem specifically arising in the realm of computers and computer networks including automation control systems used in industrial facilities.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method of synchronizing controllers in an automation control system, the method comprising:
arranging a plurality of redundancy elements in the automation control system comprising a plurality of nodes, wherein the plurality of redundancy elements include at least one primary controller and a plurality of concurrent secondary controllers, and wherein a back-up to the at least one primary controller exists on at least one node among the plurality of nodes;
backing-up the at least one primary controller by a first concurrent secondary controller among the plurality of concurrent secondary controllers;
creating using a trickle synch mechanism, a second concurrent secondary controller for the at least one primary controller, wherein the second concurrent secondary controller is maintained as a new and as an alternate secondary controller to the first concurrent secondary controller; and
moving, using a M:N redundancy, the first concurrent secondary controller to another node among the plurality of nodes for load balancing or an equipment update to prevent loss during shut down or disruption to the automation control system,
where M=a total number of nodes and N=a number of failed nodes in the M:N redundancy,
wherein the M:N redundancy relates to a backup to the at least one primary controller existing on any node in a hive comprising a collection of physical controllers as a single virtual pool of compute to float across any hardware within the automation control system,
when nodes among the plurality of nodes fail thereby comprising failed nodes, the remaining nodes among the plurality of nodes adapt and fail over any of the primary controller on the failed nodes and reestablish the secondary controller capability on remaining M-N nodes in the M:N redundancy.

2. The method of claim 1, wherein the redundancy elements comprise compute nodes that support a workload of the at least one primary controller or the at least one secondary controller.

3. The method of claim 1, wherein the automation control system comprises an automation control hive.

4. The method of claim 3, wherein the automation control hive comprises control applications and an environment not bound to dedicated hardware, but which float across any hardware within the automation control hive.

5. The method of claim 1, wherein the at least one primary controller and each concurrent secondary controller among the plurality of concurrent secondary controllers comprise a process controller.

6. The method of claim 1, wherein the equipment update comprises at least one of a controller firmware or a software migration.

7. The method of claim 1, wherein the equipment update comprises a controller hardware migration.

8. A system for synchronizing controllers for automation control, the system comprising:
a plurality of redundancy elements arranged in an automation control system comprising a plurality of nodes, wherein the plurality of redundancy elements include at least one primary controller and a plurality of concurrent secondary controllers, and wherein a back-up to the at least one primary controller exists on at least one node among the plurality of nodes;

the back-up of the at least one primary controller by a first concurrent secondary controller among the plurality of concurrent secondary controllers; and a second concurrent secondary controller as a new and as an alternate secondary controller to the first concurrent secondary controller, wherein the second concurrent secondary controller is created using a trickle synch mechanism;

wherein the system is configured to move, using a M:N redundancy, the first concurrent secondary controller to another node among the plurality of nodes for load balancing or an equipment update to facilitate prevention of a loss during a shut down or a disruption to the automation control system, where M=a total number of nodes and N=a number of failed nodes in the M:N redundancy, wherein the M:N redundancy relates to a backup to the at least one primary controller existing on any node in a hive comprising a collection of physical controllers as a single virtual pool of compute to float across any hardware within the automation control system, when nodes among the plurality of nodes fail thereby comprising failed nodes, the remaining nodes adapt and both fail over any of the primary controller on the failed nodes and reestablish the secondary controller capability on remaining M-N nodes in the M:N redundancy.

9. The system of claim 8, wherein the redundancy elements comprise compute nodes that support a workload of the at least one primary controller or the at least one secondary controller.

10. The system of claim 8, wherein the automation control system comprises an automation control hive.

11. The system of claim 10, wherein the automation control hive comprises control applications and an environment not bound to dedicated hardware, but which float across any hardware within the automation control hive.

12. The system of claim 8, wherein the at least one primary controller and each concurrent secondary controller among the plurality of concurrent secondary controllers comprise a process controller.

13. The system of claim 8, wherein the equipment update comprises at least one of a controller firmware or a software migration.

14. The system of claim 8, wherein the equipment update comprises a controller hardware migration.

15. A system for synchronizing controllers for automation control, comprising:

a non-transitory computer-usable medium embodying computer program code, the computer-usable medium capable of communicating with at least one processor, the computer program code comprising instructions executable by the at least one processor and configured for:

arranging a plurality of redundancy elements in an automation control system comprising a plurality of nodes, wherein the plurality of redundancy elements include at least one primary controller and a plurality of concurrent secondary controllers, and wherein a back-up to the at least one primary controller exists on at least one node among the plurality of nodes;

backing-up the at least one primary controller by a first concurrent secondary controller among the plurality of concurrent secondary controllers creating using a trickle synch mechanism, a second concurrent secondary controller for the at least one primary controller, wherein the second concurrent secondary controller is maintained as a new and as an alternate secondary controller to the first concurrent secondary controller; and moving, using a M:N redundancy, the at least one secondary controller to another node among the plurality of nodes for load balancing or an equipment update to facilitate prevention of a loss during a shut down or a disruption to the automation control system, where M=a total number of nodes and N=a number of failed nodes in the M:N redundancy, wherein the M:N redundancy relates to a backup to the at least one primary controller existing on any node in a hive comprising a collection of physical controllers as a single virtual pool of compute to float across any hardware within the automation control system, when nodes among the plurality of nodes fail thereby comprising failed nodes, the remaining nodes among the plurality of nodes adapt and fail over any of the primary controller on the failed nodes and reestablish the secondary controller capability on the remaining M-N nodes in the M:N redundancy.

16. The system of claim 15, wherein the redundancy elements comprise compute nodes that support a workload of the at least one primary controller or the at least one secondary controller.

17. The system of claim 15, wherein the automation control system comprises an automation control hive that comprises control applications and an environment not bound to dedicated hardware, but which float across any hardware within the automation control hive.

18. The system of claim 15, wherein the at least one primary controller and each concurrent secondary controller among the plurality of concurrent secondary controllers comprise a process controller.

19. The system of claim 15, wherein the equipment update comprises at least one of a controller firmware or a software migration.

20. The system of claim 15, wherein the equipment update comprises a controller hardware migration.

* * * * *